(12) United States Patent
Miyagawa et al.

(10) Patent No.: US 6,547,694 B2
(45) Date of Patent: Apr. 15, 2003

(54) HYDRAULIC CONTROL SYSTEM FOR A CONTINUOUSLY VARIABLE TRANSMISSION

(75) Inventors: Yoshikazu Miyagawa, Fuji (JP); Satoshi Sakakibara, Fuji (JP)

(73) Assignee: Jatco Transtechnology Ltd. (JP)

( * ) Notice: Subject to any disclaimer, the term of this patent is extended or adjusted under 35 U.S.C. 154(b) by 0 days.

(21) Appl. No.: 09/805,730

(22) Filed: Mar. 14, 2001

(65) Prior Publication Data

US 2001/0023217 A1 Sep. 20, 2001

(30) Foreign Application Priority Data

Mar. 17, 2000 (JP) ........................................ 2000-076792

(51) Int. Cl.[7] .............................................. B60K 41/12
(52) U.S. Cl. .......................................... 477/45; 477/46
(58) Field of Search .............................. 477/45, 46, 44, 477/101, 107, 10, 115, 18

(56) References Cited

U.S. PATENT DOCUMENTS 4,827,803 A * 5/1989 Miyawaki .................... 477/46
5,628,705 A * 5/1997 Kashiwabara ................. 477/46
5,803,862 A * 9/1998 Ochiai et al. ................. 477/45
5,931,884 A * 8/1999 Ochiai ........................ 477/101
6,089,999 A * 7/2000 Imaida et al. ................ 474/18
6,311,113 B1 * 10/2001 Danz et al. ................... 474/28

FOREIGN PATENT DOCUMENTS

JP           5-716274        3/1993

\* cited by examiner

*Primary Examiner*—Christopher P. Schwartz
*Assistant Examiner*—Melanie Torres
(74) *Attorney, Agent, or Firm*—Rossi & Associates

(57) ABSTRACT

A CVT has primary and secondary pulleys, and a control unit for controlling the transmission ratio by controlling the line pressure applied to the first and secondary pulleys. The control unit calculates a standard step position of a step motor corresponding to the target transmission ratio and provides a command signal representative of the difference between the standard step position and the current position of the step motor. A shift control valve actuated by the step motor controls the pressure to be applied to the primary pulley. The control unit compares the actual transmission ratio with the target transmission ratio, and if the shift is not completed, the control unit commands an additional step number. Unless the shift to the HI side is accomplished when the additional step number reaches the threshold value, the line pressure is increased to achieve the shift.

9 Claims, 3 Drawing Sheets

HYDRAULIC CONTROL SYSTEM FOR A CONTINUOUSLY VARIABLE TRANSMISSION

BACKGROUND OF THE INVENTION

1. Field of the Invention

The present invention relates in general to a continuously variable transmission of the type employing a V-belt for use in a vehicle or the like, and more particularly to improvements in a hydraulic control system for the same.

2. Description of the Prior Art

A V-belt type continuously variable transmission (CVT) suitable for vehicle applications is disclosed in, for example, Japanese Patent Application Laid Open No. 11-82725.

In such a V-belt type continuously variable transmission, a V-belt passes about a primary pulley which is coupled to an engine and a secondary pulley which is coupled to the wheel axle of the vehicle. The groove width of the primary pulley is variably controlled by the supply of hydraulic pressure. The general construction of the transmission together with a conventional hydraulic control system therefor is shown in FIGS. 2 and 3.

The transmission mechanism 10 comprises a primary pulley 16, a secondary pulley 26 and a V-belt 24 provided between the primary and secondary pulleys 16 and 26, and is coupled to an engine (not shown) via a torque converter 12 with a lockup clutch 11 incorporated therein.

More particularly, the primary pulley 16 comprises a pair of fixed and moving conical boards 18 and 22, which are facing each other to define V-shaped pulley groove therebetween. The fixed conical board 18 is fixedly connected to an output shaft of the torque converter 12 for rotation therewith. The primary pulley 16 is provided with first cylinder chamber 20, and the moving conical board 22 can be axially displaced by supplying hydraulic pressure to the first cylinder chamber 20.

The secondary pulley 26 also comprises a pair of fixed and moving conical boards 30 and 34, which are facing each other to define V-shaped pulley groove therebetween. The fixed conical board 30 is fixedly connected to an output shaft associated with an axle(not shown) for rotation therewith. The secondary pulley 26 is provided with second cylinder chamber 32, and the moving conical board 34 can be axially displaced by supplying hydraulic pressure to the second cylinder chamber 32. The moving conical board 34 is also normally biased in a direction reducing the width of the corresponding pulley groove by a return spring (not shown).

The operation of the transmission mechanism 10 can be controlled by the hydraulic control valve system 3 in dependence on control signals from the CVT control unit 1.

The second cylinder chamber 32 of the secondary pulley 26 is continuously supplied with a predetermined line pressure from the hydraulic control valve system 3 and the first cylinder chamber 20 of the primary pulley 16 can be placed in fluid communication with a shift control valve 63 of the valve system 3. It should be noted that a pressure receiving net area of the first cylinder chamber 20 is set to be greater than that of the second cylinder chamber 32.

While the line pressure is supplied to the second cylinder chamber 32, the shift control valve 63 maybe operated to control the hydraulic pressure supplied to the first cylinder chamber 20 so as to continuously change the width of the groove of the primary pulley 16 to thereby control a force for clamping the V belt 24 between the opposite conical boards.

In this way, driving torque can be transmitted between the output shaft of the torque converter and the output shaft associated with the axle depending on the frictional force between the V-belt 24 and the pulleys 16 and 26.

The transmission mechanism 10 may vary the effective contact radius of the V-belt 24 at the contact position of each of the first and second pulleys 16 and 26 by changing the width of the pulley grooves of the respective pulleys, resulting in variation in the speed ratio between the primary and secondary pulleys 16 and 26. More specifically, the transmission mechanism 10 can establish a high transmission ratio (i.e., a pulley ratio LOW) by widening the primary pulley groove to decrease the effective contact radius of the V-belt 24 on the primary pulley 16 and to increase the effective contact radius of the V-belt 24 at the secondary pulley 26. Thus, the rotation of the engine side is transmitted to reduced rotation of the axle side.

The transmission mechanism 10 can also establish a low transmission ratio (i.e., a pulley ratio HI) by narrowing the primary pulley groove to increase the effective contact radius of the V-belt 24 on the primary pulley 16. In this case, the rotation of the engine side is transmitted to increased rotation of the axle side.

As can be seen, the transmission ratio can be continuously changed as a function of the ratio of the contact radii of the V-belt 24 on the primary pulley 16 and on the secondary pulley 26.

The hydraulic control valve system 3 also includes a line pressure regulator 60 which is adapted to receive and regulate hydraulic pressure from a hydraulic pump 80, and continuously supplies the regulated line pressure to both the second cylinder chamber 32 and an input port of the shift control valve 63. To control the hydraulic pressure supplied to the first cylinder chamber 20, the shift control valve 63 actuated by a step motor 64 regulates the line pressure as the original pressure. As well known in the art, the valve system 3 further comprises a line pressure solenoid valve 4, a pressure modifier valve 62 and a pilot valve 61 also in fluid communication with the valve 4.

The CVT control unit 1 is adapted to separately receive a signal representative of a selected position of an inhibitor switch 8, a signal representative of throttle opening degree TVO (a degree of depression of the accelerator pedal operated by the operator) generated by a throttle opening sensor 5 and a signal representative of an engine rpm Ne from an engine speed sensor (not shown) and estimate an engine torque on the basis of these signals. Then, the CVT control unit 1 determines the required line pressure on the basis of the estimated engine torque and provides a duty ratio signal to the line pressure solenoid 4 and also issue a command to the step motor 64 to initiate shift control for the target transmission ratio. When the step motor 64 is a total of 200 step positions, for example, 20 to 170 positions thereof may advantageously be utilized for establishment of the target transmission ratio.

The line pressure solenoid 4 is operable to supply the hydraulic pressure from the pilot valve 61 to the pressure modifier valve 62 in response to the input duty ratio signal from the CVT control unit 1 and the line pressure regulator 60 is operable to regulate the hydraulic pressure from the hydraulic pump 80 in dependence on the hydraulic pressure demand signal generated by the pressure modifier valve 62. In this way, the line pressure can be varied within the predetermined range depending on the required torque to be transmitted.

The shift control valve 63 has a spool 63a which at its one end is pivotally connected to a shift link 67 which in turn at one end is connected to the moving conical board 22 of the primary pulley 16 via a movable member 71 and at the other end to the step motor 64. The spool 63a slides according to the displacement of the shift link 67.

The shift control valve 63 receives the line pressure from the line pressure regulator 60, and supply the controlled pressure, which is reduced from the line pressure by the displacement of its spool 63a, to the first cylinder chamber 20 to thereby change the width of the primary pulley groove. In this way, the desired transmission ratio is attained.

The CVT control unit 1 has connected thereto a first speed sensor 6 which detects the rotational speed (Npri) of the primary pulley 16 and also a second speed sensor 7 which detects the rotational speed (Nsec) of the secondary pulley 26. The CVT control unit receives the Npri and Nsec signals from the first and second speed sensor 6 and 7, respectively and determines the actual transmission ratio.

As for the further details of the FIGS. 2 and 3 arrangement, reference should be made, as needed, to the above mentioned Japanese Patent Application Laid Open No. 11-82725, the disclosure of which is hereby incorporated by reference in its entirety.

Typically, it is necessary to adjust the line pressure applied from the line pressure regulating valve 60 to the shift control valve 63 and the second cylinder chamber 32 to a level sufficient to ensure that the V-belt can transmit torque from the primary pulley 16 to the secondary pulley 26 without any slippage. Greater line pressure than is necessary may give rise to an increased frictional loss at the contact area between the V-belt 24 and each of the pulleys 16 and 26, which in turn can lead to a drop in gas mileage. Accordingly, it is common practice to set the line pressure generated by the line pressure regulator 60 at the lowest possible level as long as it can provide the proper torque transfer between the pulleys 16 and 26.

However, at the relatively low degree of depression of the accelerator pedal or the relatively low (e.g. on the order of 1/8) throttle opening degree, the CVT may undesirably retard, possibly discontinue, its shift to the transmission rate on the HI side (sometimes referred to as "upshift" hereinafter) and as a result the available range of the transmission ratio will become actually narrowed.

More specifically, in order to maintain the current transmission ratio established by the transmission mechanism 10, it is necessary for the ratio of the thrust acting to urge the moving conical board 22 toward the fixed conical hoard 18 and to the thrust acting to urge the moving conical board 34 toward the fixed conical board 30 to fall within a predetermined range that can be defined by the ratio of the pressure receiving net area of the first cylinder chamber 20 to that of the second cylinder chamber 32. When the thrust acting on the primary pulley 16 is so low that it is out of the predetermined range, the transmission mechanism 10 may tend to shift the transmission ratio toward the LOW side.

The thrust acting axially on the primary pulley 16 depends almost on the hydraulic pressure applied to the first cylinder chamber 20, whereas the thrust on the secondary pulley 26 is the sum of the hydraulic pressure applied to the second cylinder chamber 32, the axial biasing force of the return spring on the moving conical board 34 and the axial components of the force based on the torque transmitted from the V-belt 24 to the secondary pulley 26. Accordingly, in view of the fact that the very low (normally the lowest) line pressure is set at the relatively low (e.g. on the order of 1/8) throttle opening degree, thus lowering the level of the hydraulic pressure in the first and second cylinder chambers, the effect of the thrust forces other than the hydraulic pressure is prevailing and as a result, the proper relationship as described above cannot be maintained.

Accordingly, it is an object of the present invention to overcome the drawbacks mentioned above and to provide a hydraulic control system for use with a continuously variable transmission that can minimize the loss of transmitted torque from the primary pulley to the secondary pulley due to the frictional loss between the V-belt and the pulleys to enhance the fuel economy while establishing the upshift operation as designed.

SUMMARY OF THE INVENTION

The above object is attained in accordance with the present invention by providing a hydraulic control system for a continuously variable transmission comprising a transmission mechanism which includes a set of adjustable first and second pulleys having first and second cylinder chambers, respectively, width of respective pulleys being variable according to hydraulic pressure applied to said cylinder chambers, and a belt provided between the pulleys so as to transmit torque therebetween; means for producing a line pressure and continuously supplying the line pressure to said second chamber; a shift control valve adapted to be operated under the action of an actuator associated therewith to supply a pressure which is reduced from said line pressure to the first cylinder chamber; and shift control means for generating a shift command to the actuator depending on a driving condition and modifying the line pressure, characterized in that said shift control means includes means for determining whether or not said shift is accomplished, said shift control means being operable to raise the line pressure from a first level to a second level when said determining means determines that the shift to the HI side is not accomplished.

With this arrangement, the raised line pressure is applied only when the shift to the HI side is not accomplished. In other words, before the upshifting is initiated the line pressure is maintained to a low level allowing reduction of the friction loss in the transmission mechanism, and also maintained at that low level as far as the upshift is accomplished, thus resulting in an enhanced fuel economy.

In an aspect of the present invention, the actuator comprises a step motor which is adapted to be driven to an expected step position corresponding to a target transmission ratio to be established, said shift control means being operable to drive the step motor additionally in increments of a predetermined number of step and to raise the line pressure to the second level unless the shift to the HI side is accomplished at the time when the additional step number reaches a predetermined value.

Until it is found that the shift to the HI side may be not accomplished after the step motor has been driven so that the cumulative total number of additional steps reaches the predetermined value, the line pressure is not raised. Accordingly, the shift control means is less susceptible to some delay in response and therefore does not prematurely change the line pressure. Since the number of steps to be added is related to the predetermined value, the length of time taken to determine whether or not the shift to the HI side is accomplished may remain unchanged. Thus, steady control should be guaranteed.

In another aspect of the invention, the actuator comprises a step motor which is adapted to be driven to an expected step position corresponding to a target transmission ratio to be established, said shift control means being operable to drive said step motor additionally in increments of a predetermined number of step and to raise the line pressure to the second level unless the shift to the HI side is accomplished at the time when said step motor is actuated to a position corresponding to the maximum speed ratio.

Again, the shift control means is less susceptible to a delay in response and therefore does not undesirably change the line pressure. On the other hand, since the step motor is driven continuously in increments of the predetermined number of step to the position corresponding to the maximum speed ratio, there is no need for counting the number of the increments, which in turn may contribute to reduced computing load and costs involved.

In another aspect, the determining means determines whether or not the shift is accomplished by comparing the speed ratio of the set of the pulleys with the target transmission ratio.

In another aspect of the invention, the shift control means is operable to reduce the raised line pressure to the first level once it is determined that the shift to the HI side is accomplished after raising the line pressure. Thus, except the minimum period of time taken to attain the shift to the HI side, the hydraulic pressure applied to the transmission mechanism is normally maintained at a low level providing the less frictional loss.

DETAILED DESCRIPTION OF THE PREFERRED EMBODIMENT OF THE INVENTION

Figure 2:
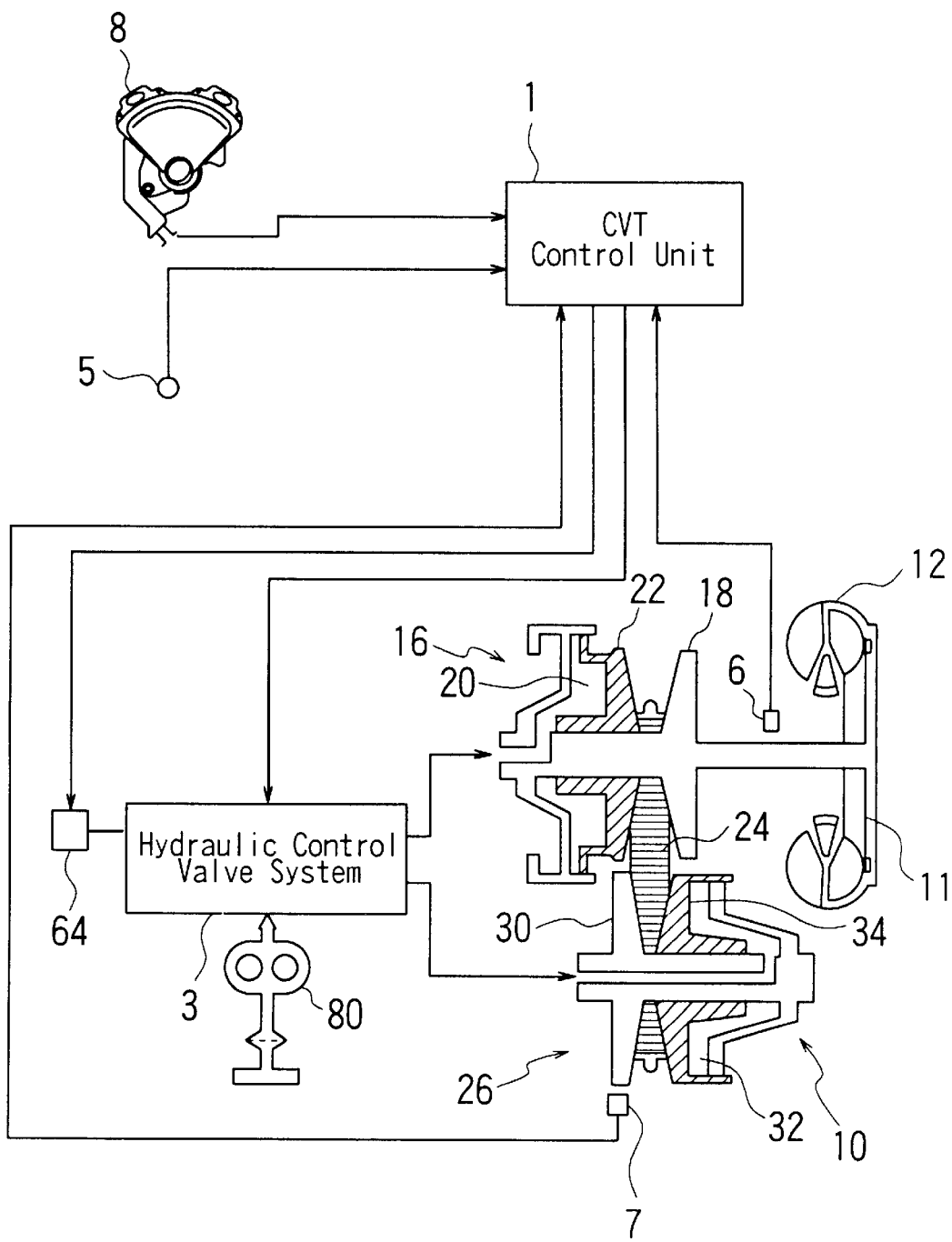
FIG. 2 is a schematic diagram of a V-belt type continuously variable transmission in which the present invention is implemented.
Figure 3:
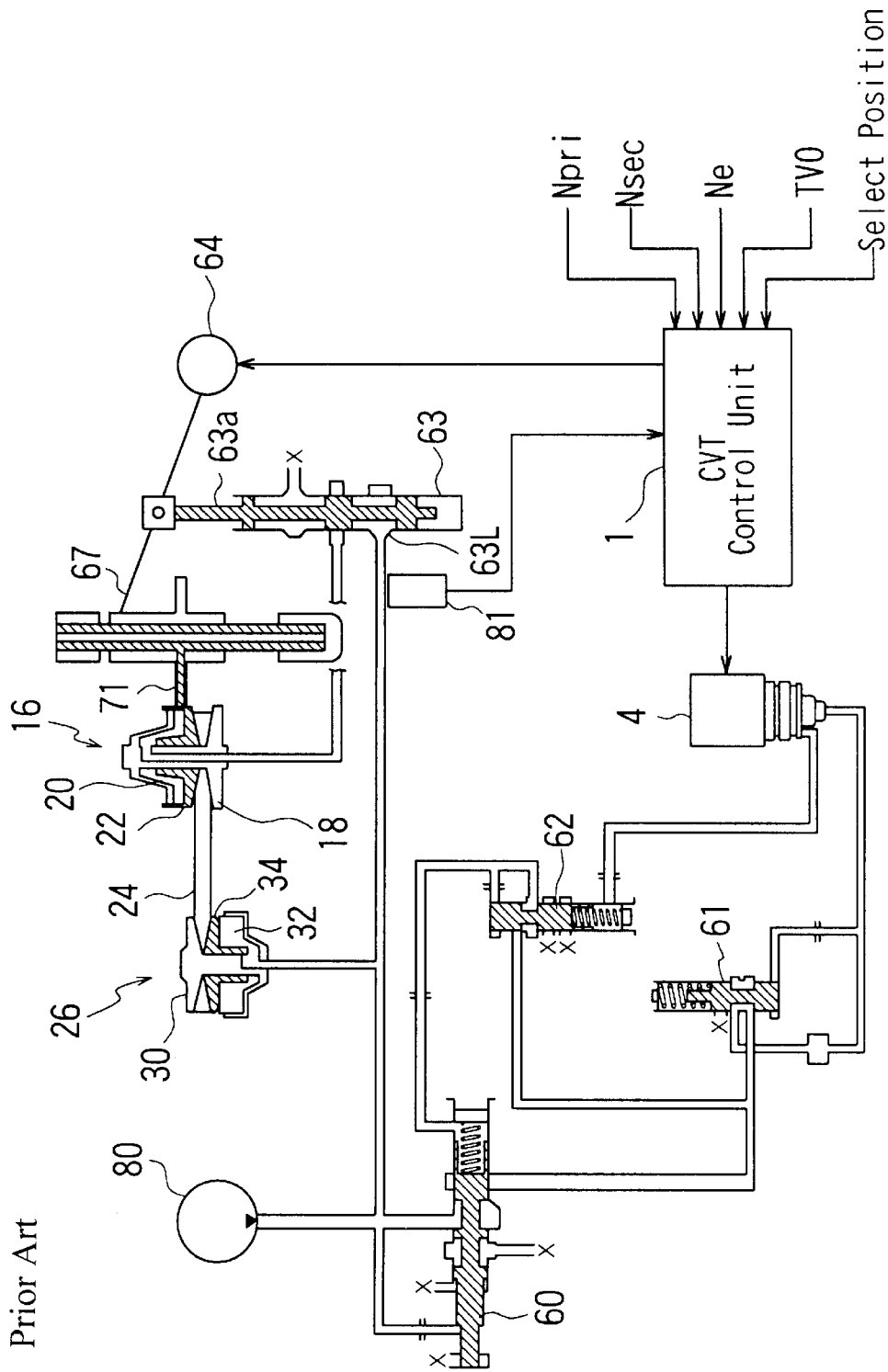
FIG. 3 is a schematic diagram of an hydraulic control circuit for use with the continuously variable transmission.

Description will now be made in detail of an embodiment according to the present invention as applied to the conventional arrangement shown in FIGS. 2 and 3 and outlined above. In the normal control, the minimum line pressure to be established by the CVT control unit 1 is at a first pressure setting, which is the lowest value in consistent with the torque being transmitted. The control unit 1 is operable to change the minimum line pressure to a second pressure setting which is higher than the first setting when the upshift to HI side operation through the control of the step motor 64 would fail to establish the target transmission ratio. Other structure and operation of various components of the system are same as those shown in FIGS. 2 and 3, and reference should be made to the above mentioned Japanese Patent Application Laid Open No. 11-82725.

Figure 1:
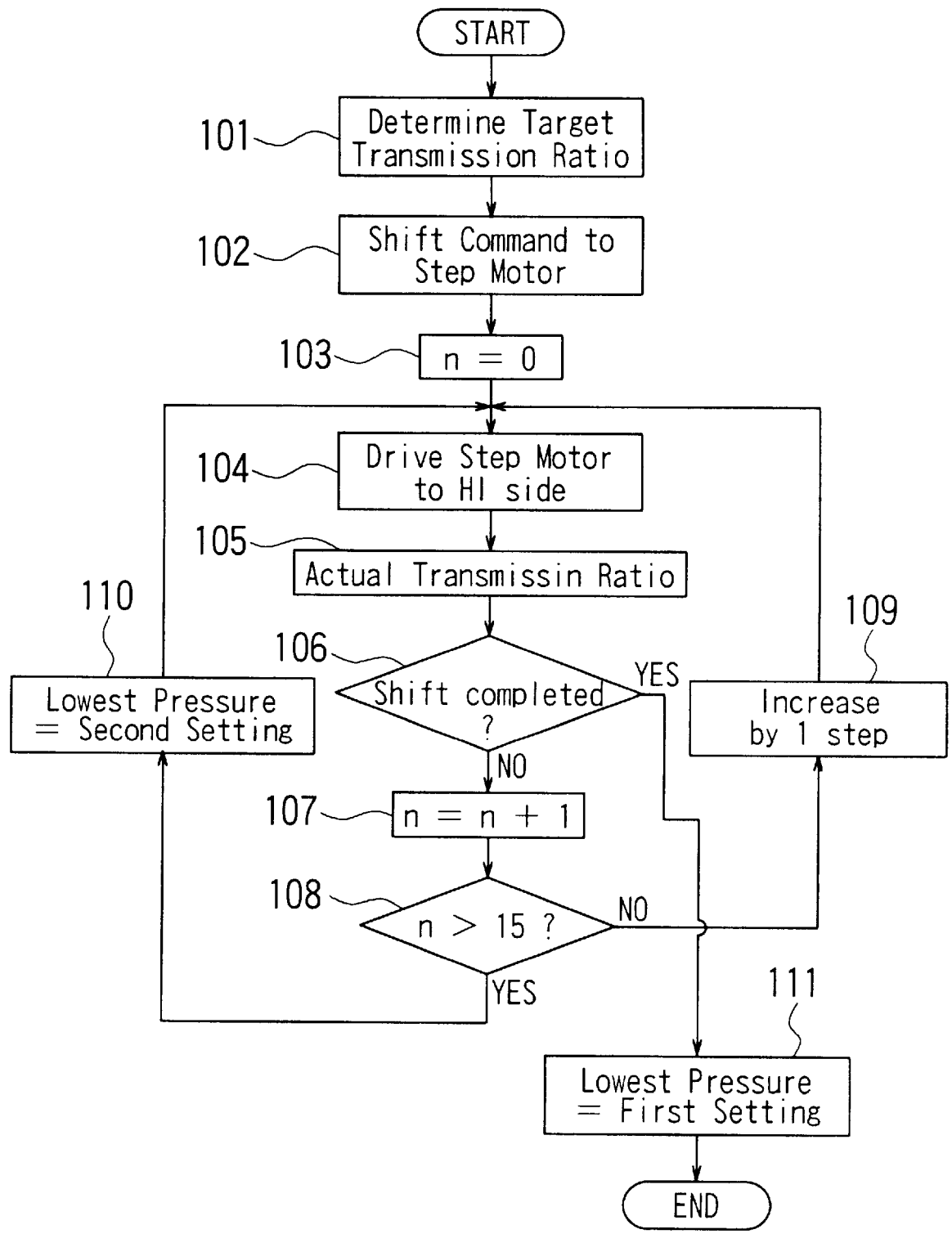
FIG. 1 is a flow chart showing a shift control process preformed by a CVT hydraulic control system according to an embodiment of the invention.

FIG. 1 is a flow chart showing a shift control process or program performed by the CVT control unit 1 and the operation of the hydraulic control valve system 3.

The line pressure regulator 60 of the hydraulic control valve system 3 can regulate pressure of the hydraulic fluid from the pump 80 within the range from the minimum pressure of the first setting (e.g., 0.6 Mpa) up to the maximum of about 4 Mpa in response to the command signal from the CVT control unit 1 and supply the regulated pressure as a line pressure.

The hydraulic pump 80 and the hydraulic control valve system 3, which includes the line pressure solenoid 4, pressure modifier valve 62, pilot valve 61 and line pressure regulator 60 correspond to the "line pressure supplying means" of the invention.

With reference to FIG. 1, in a step 101, the CVT control unit 1 determines the target transmission ratio to initiate the shift control process. The program proceeds to a step 102, in which a standard step position of the step motor 64 corresponding to the target transmission ratio is calculated and a command signal representative of a difference between the standard step position and the current position of the step motor 64 is issued to the step motor 64. In the description follows, it is assumed that the CVT control unit 1 handles the shift to the HI side or upshift.

In a step 103, the additional step number n is initialized as zero (i.e., n=0) for later process.

In a step 104, the step motor 64 is actuated by the step number of the command signal as mentioned above. Then, the shift control valve 63 is operated through the shift link 67 coupled to the step motor 64 so that the shift control valve 63 begins to supply a pressure to the first cylinder chamber 20 of the primary pulley 16. As a result, the transmission mechanism 10 is operated to move gradually axially the moving conical board 22 of the primary pulley 16 toward the fixed conical board 18 thereof and change (in this case, increase) the contact radius of the V-belt 24.

In a next step 105, the CVT control unit 1 receives signals representative of the rotation speeds Npri and Nsec of the primary and secondary pulleys 16 and 26 from the first and second speed sensors 6 and 7, respectively and determines the actual transmission ratio on the basis of the signals.

In a step 106, it is checked whether the shift to HI side is accomplished or not by comparing the actual transmission ratio with the target transmission ratio. If the shift is not accomplished, the process goes to a step 107.

In a step 107 the additional step number n is incremented by the value "1" (i.e., n=n+1).

In a next step 108, it is checked whether the additional step number n exceeds a predetermined threshold value (for example, 15).

If the threshold value is not exceeded, the process goes to a step 109, where the CVT control unit 1 issues a command signal to drive the step motor 64 by the increment of 1 step, and then returns to the step 104.

If it is determined that the additional step number n exceeds the threshold value of 15 in the step 108, the process goes to a step 110, where the CVT control unit 1 control the line pressure solenoid 4 in such a manner as to change the minimum line pressure from the first setting (first level) to the second setting (second level), and then returns to the step 104.

When it is determined that the shift to the HI side is completed in the step 106, the process goes to a step 111, in which the minimum line pressure is returned to the first setting. Thereafter, the control program is exited.

As apparent from the foregoing, the CVT control unit 1 allows the transmission mechanism 10 to normally operate with the minimum line pressure of the first setting lower than the second setting which is enough to ensure the reliable torque transmitting capability. In the case where the target transmission ratio is not established in spite of the fact the step motor 64 is caused to assume its standard step position corresponding to the target transmission ratio during upshifting, the CVT control unit continues to drive the step motor 64 incrementally in the upshift direction and stops its operation once the target transmission ratio is established.

However, unless the target transmission ratio is established at the time when the step motor is driven so that the additional step number reaches the threshold value, the CVT control unit raises the minimum line pressure from the first setting to the second setting which is higher than the first setting, thereby successively attaining the upshift tp HI side. Once the target transmission ratio is obtained, the minimum line pressure of the second setting is returned to the first setting.

It is noted that the CVT control unit 1 corresponds to the "shift control means" and also the step 106 performed in the control process by the CVT control unit 1 corresponds to "means for determining whether or not the shift is accomplished".

In the embodiment as shown above, the minimum line pressure is maintained at the first setting which allows reduction of the friction loss between the V-belt 24 and pulleys 16 and 26 except for the case where the upshift to HI side is not accomplished. Only when the upshift to HI side is not accomplished, the minimum line pressure is changed to the higher second setting and once the upshift is accomplished the minimum line pressure is returned to the first setting. Since the minimum line pressure is maintained at the first setting as long as possible, an improved fuel economy is obtained.

In the embodiment disclosed, the CVT control unit utilizes counting of the additional step number until it reaches the threshold value in an attempt to determine whether or not the transmission ratio is established. Alternatively, instead of the counting procedure, the CVT control unit may operate to drive the step motor 64 incrementally until it reaches its step position corresponding to the maximum speed ratio and at that point raise the minimum line pressure from the first setting to the second setting. This will contributes to reduced computing load involved in the operation of the CVT control unit 1.

While the present embodiment has been described as applied to the system as disclosed in the Japanese Patent Application Laid Open No. 11-82725, the present invention is not restricted to engine-driven vehicles of the type having the CVT whose primary pulley is directly coupled to the torque converter and finds application in various types of vehicles.

For example, in hybrid vehicles having both of an engine and electric motor as prime mover the transmission mechanism may be connected to the electric motor.

Also, the hydraulic control valve may be placed in fluid communication with an hydraulic pump actuated by the electric motor or a specially designed motor instead of the hydraulic pump driven by the engine.

What is claimed is:

1. A hydraulic control system for a continuous variable transmission comprising:

a transmission mechanism having a set of adjustable first and second pulleys having first and second cylinder chambers, respectively, width of respective pulleys being variable according to hydraulic pressure applied to said cylinder chambers, and a belt entraining the pulleys to transmit torque therebetween;

means for producing a line pressure and continuously supplying the line pressure to said second chamber;

a shift control valve adapted to be operated under the action of an actuator associated therewith to supply a pressure that is reduced from said line pressure to the first cylinder chamber; and shift control means for generating a shift command to the actuator depending on a driving condition and modifying the line pressure, wherein said shift control means includes means for determining whether or not said shift is accomplished, said shift control means being operable to raise the line pressure from a first level to a second level when said determining means determines that the shift to a HI side is not accomplished.

2. A hydraulic control system for a continuously variable transmission according to claim 1, wherein said actuator comprises a step motor adapted to be driven to a target step position corresponding to a target transmission ratio to be established, said shift control means being operable to drive the step motor additionally in increments of a predetermined number of step and to raise the line pressure to the second level unless the shift to the HI side is accomplished when the additional step number reaches a predetermined value.

3. A hydraulic control system for a continuously variable transmission according to claim 1, wherein said actuator comprises a step motor adapted to be driven to a target step position corresponding to a target transmission ratio to be established, said shift control means being operable to drive said step motor additionally in increments of a predetermined number of step and to raise the line pressure to the second level unless the shift to the HI side is accomplished when said step motor is actuated to a position corresponding to the maximum speed ratio.

4. A hydraulic control system for a continuously variable transmission according to claim 1, wherein said determining means determines whether or not the shift is accomplished by comparing the speed ratio of the set of the pulleys with the target transmission ratio.

5. A hydraulic control system for a continuously variable transmission according to claim 1, wherein said shift control means is operable to reduce the raised line pressure to the first level once it is determined that the shift to the HI side is accomplished after raising the line pressure.

6. A hydraulic control system for a continuously variable transmission according to claim 2.

wherein said determining means determines whether or not the shift is accomplished by comparing the speed ratio of the pulleys with the target transmission ratio.

7. A hydraulic control system for a continuously variable transmission according to claim 3, wherein said determining means determines whether or not the shift is accomplished by comparing the speed ratio of the the pulleys with the target transmission ratio.

8. A hydraulic control system for a continuously variable transmission according to claim 2, wherein said shift control means is operable to reduce the raised line pressure to the first level once it is determined that the shift to the HI side is accomplished after raising the line pressure.

9. A hydraulic control system for a continuously variable transmission according to claim 3, wherein said shift control means is operable to reduce the raised line pressure to the first level once it is determined that the shift to the HI side is accomplished after raising the line pressure.

* * * * *